United States Patent
Lee (10) Patent No.: US 9,403,321 B2
(45) Date of Patent: Aug. 2, 2016

(54) METHOD FOR MANUFACTURING HIGH PERFORMANCE BUTTERFLY VALVE LINER

(71) Applicant: Fluonics Corp., Gangwon-do (KR)

(72) Inventor: Sang Seon Lee, Gangwon-do (KR)

(73) Assignee: Fluonics Corp., Gangwon-do (KR)

( * ) Notice: Subject to any disclaimer, the term of this patent is extended or adjusted under 35 U.S.C. 154(b) by 0 days.

(21) Appl. No.: 14/439,234

(22) PCT Filed: Nov. 8, 2012

(86) PCT No.: PCT/KR2012/009357
§ 371 (c)(1),
(2) Date: Apr. 29, 2015

(87) PCT Pub. No.: WO2014/069704
PCT Pub. Date: May 8, 2014

(65) Prior Publication Data
US 2015/0258730 A1    Sep. 17, 2015

(30) Foreign Application Priority Data
Oct. 29, 2012    (KR) .......................... 10-2012-0120502

(51) Int. Cl.
*F16K 27/02* (2006.01)
*B29C 57/04* (2006.01)
(Continued)

(52) U.S. Cl.
CPC ............. *B29C 66/4322* (2013.01); *B29C 57/04* (2013.01); *F16K 27/0218* (2013.01); *F16K 27/0272* (2013.01); *B29C 53/40* (2013.01); *B29C 65/02* (2013.01); *B29C 66/1122* (2013.01);
(Continued)

(58) Field of Classification Search
None
See application file for complete search history.

(56) References Cited

U.S. PATENT DOCUMENTS

| 3,692,276 A | 9/1972 | Conners et al. |
| 5,370,148 A | 12/1994 | Shafer |
| 2002/0074040 A1 | 6/2002 | Schwarz |

FOREIGN PATENT DOCUMENTS

| JP | 2008-298178 | 12/2008 |
| KR | 10-2003-0086547 | 11/2003 |

(Continued)

OTHER PUBLICATIONS

International Search Report Dated Apr. 12, 2013 From the Korean Intellectual Property Office Re. Application No. PCT/KR2012/009357 and Its Translation Into English.

(Continued)

*Primary Examiner* — Barbara J Musser (57) ABSTRACT

The present invention relates to a method for manufacturing a high performance butterfly valve liner, comprising: a pre-processing step of preparing in advance a PTFE sheet and a cap in a predetermined size and thickness; a first welding step of welding the cap on a hole after forming the hole at a specific position of the prepared PTFE sheet; a second welding step of welding the end of the PTFE sheet after the first welding so as to form the PTFE sheet in a cylindrical shape; and a flaring step of carrying out flaring for spreading the end of the cylindrical PTFE sheet in the shape of a trumpet by means of a flaring tool, thereby finishing a liner. According to the method for manufacturing a high performance butterfly valve liner of the present invention, easy and simple manufacture is possible thereby reducing work time and manufacturing costs. In addition, a large-diameter valve can be readily manufactured without limitations on the size to be formed.

6 Claims, 7 Drawing Sheets

(51) Int. Cl.
*B29C 65/00* (2006.01)
*B29K 27/18* (2006.01)
*B29K 105/00* (2006.01)
*B29L 31/00* (2006.01)
*B29C 65/02* (2006.01)
*B29C 53/40* (2006.01)

(52) U.S. Cl.
CPC ............... *B29C66/474* (2013.01); *B29C 66/71* (2013.01); *B29C 2793/0081* (2013.01); *B29K 2027/18* (2013.01); *B29K 2105/256* (2013.01); *B29L 2031/7506* (2013.01); *Y10T 156/1043* (2015.01)

(56) References Cited

FOREIGN PATENT DOCUMENTS

| KR | 10-0431957 | 5/2004 |
| WO | WO 2014/069704 | 5/2014 |

OTHER PUBLICATIONS

Shafer Abstract, col. 4, Lines 10-52, Fig.1.

METHOD FOR MANUFACTURING HIGH PERFORMANCE BUTTERFLY VALVE LINER

RELATED APPLICATIONS

This application is a National Phase of PCT Patent Application No. PCT/KR2012/009357 having International filing date of Nov. 8, 2012, which claims the benefit of priority of Korean Patent Application No. 10-2012-0120502 filed on Oct. 29, 2012. The contents of the above applications are all incorporated by reference as if fully set forth herein in their entirety.

TECHNICAL FIELD

The present invention relates to a valve liner, and in particular to a valve liner which may improve the weakness in corrosion resistance, chemical stability, electrical characteristic and friction coefficient of a liner secured to a body of a butterfly valve.

BACKGROUND ART

In general, a valve is a device wherein a ball type disk rotates in a straight line-shaped flow passage at a right angle or a split angle, thus opening or closing the valve or changing the direction of flow.

Such a valve is easy to use and has a relatively good sealing is performance and allows the flow passage of the valve to open precisely in straight line when the valve is open, so pressure drop is less, and it is advantageous that the opening and closing may be performed with higher reliability even when the valve applies to the fluid wherein the viscosity of impurity such as sludge, etc. is high.

The butterfly valve among the conventional vales is a valve which opens and closes as a disk (a circular plate) rotates about a central line of the circular plate. Since the opening and closing operations are easily performed, the operation is quick, and such a butterfly valve has been widely used for low pressure water as well as high pressure water or vapor, air and gas.

Figure 1:
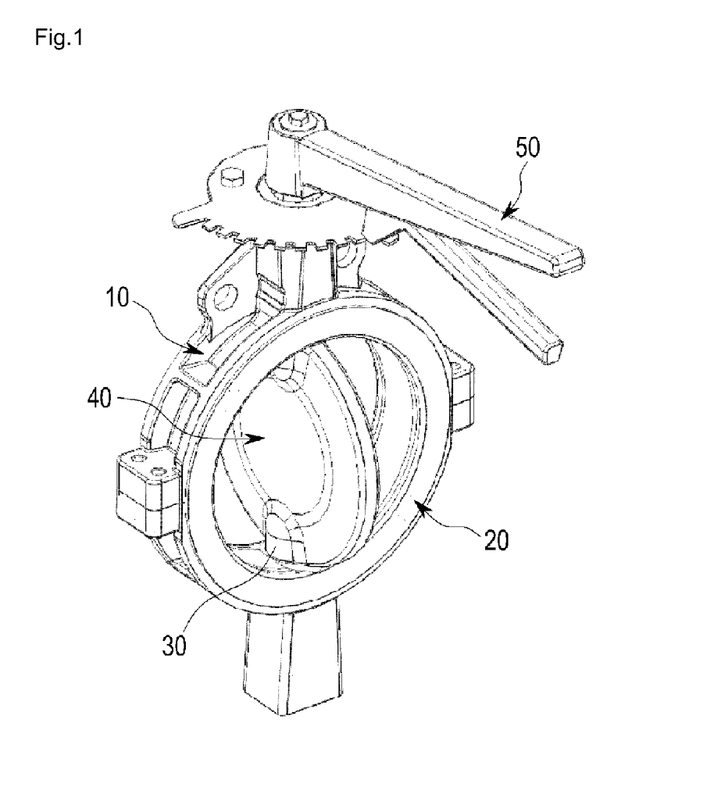
FIG. 1 is an exemplary view schematically illustrating the configuration of a conventional high performance butterfly valve.

FIG. 1 is a schematic exemplary view illustrating the configuration of a conventional high performance butterfly valve.

As illustrated in FIG. 1, a disk 40 is secured to a rotation shaft 30 disposed at an inner side of a liner 20 secured to a valve body 10, and as a handle 50 rotates, the disk 40 rotates, thus opening or closing a fluid transfer hole (not illustrated) of the valve body 10, so the movement of the fluid can be limited.

Figure 2A:
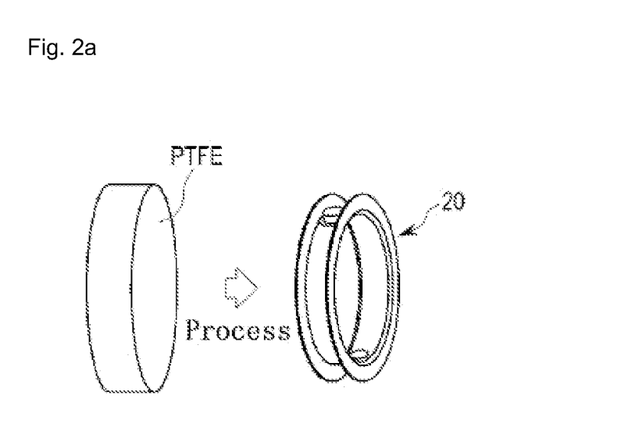
FIG. 2A is an exemplary view illustrating a procedure wherein a liner which belongs to a conventional high performance butterfly valve is being manufactured by the whole processing method.
Figure 2B:
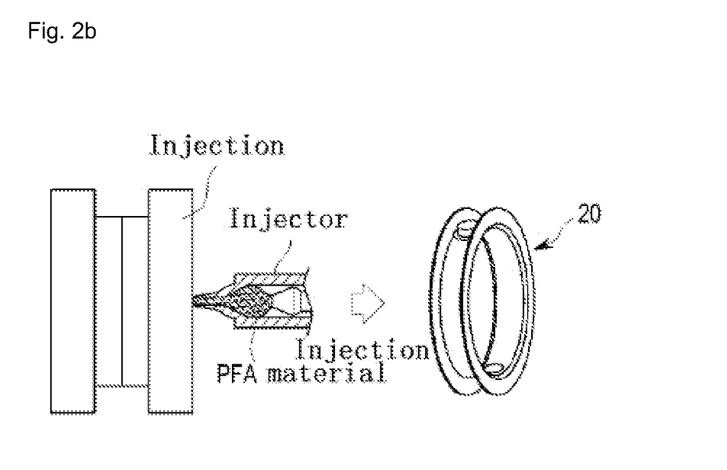
FIG. 2B is an exemplary view illustrating a procedure wherein a liner which belongs to a conventional high performance butterfly valve is being manufactured using an injection mold.
Figure 3A:
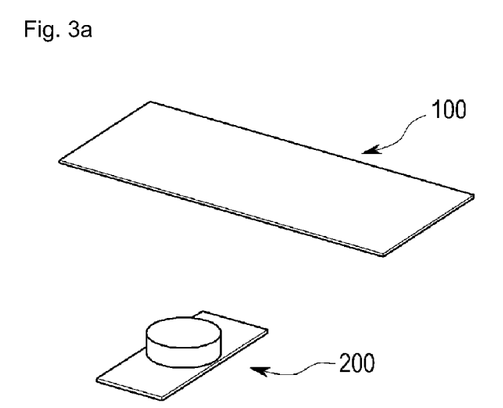
FIGS. 3A to 3D are views illustrating a procedure wherein a liner which belongs to a high performance butterfly valve is being manufactured according to a first exemplary embodiment of the present invention.
Figure 3B:
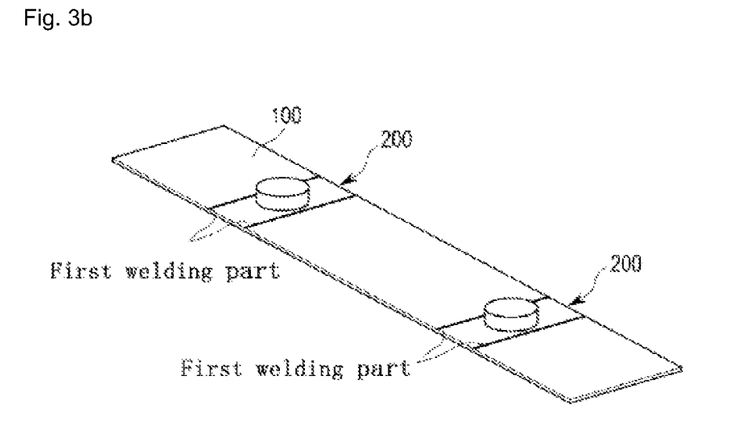
Figure 3C:
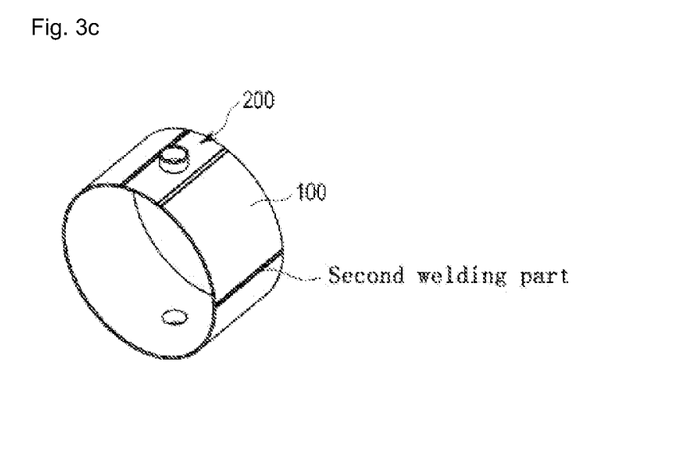
Figure 3D:
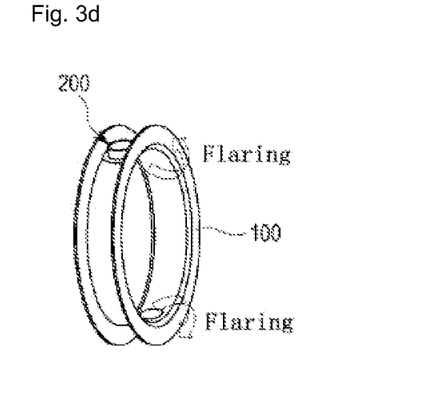

As illustrated in FIG. 2A, the liner 20 secured to the butterfly valve may be manufactured by processing the whole a polytetrafluoroethylene(PTFE) rod or as illustrated in FIG. 2B, the liner may be also manufactured in such a is way that an injection mold is manufactured, and molten perfluoroalkoxy(PFA), which is a plastic material, is injected into the injection mold using an injector.

However, the above-described conventional whole processing method and the manufacturing method using the injection mold entail considerable manufacturing time and expensive cost, so there may be a limit in the manufacturing of a large diameter valve.

SUMMARY OF THE INVENTION

Accordingly, it is an object of the present invention to provide a method for manufacturing a high performance butterfly valve wherein a liner is manufactured in such a way that a PTFE sheet with a desired size and thickness big enough for a necessary process is manufactured, and the ends of the PTFE sheet is welded into a cylindrical shape, and the ends of the cylinder is flared in a horn head shape through a flaring procedure.

To achieve the above objects, there is provided a method for manufacturing a high performance butterfly valve liner, which may include a pre-processing step wherein a PTFE sheet, which will be processed into a predetermined size and thickness, and a cap are previously manufactured; a first welding step wherein a hole is formed at a specific position of the thusly manufactured PTFE sheet, and the cap is welded on the hole; a second welding is step wherein after the first welding step, the ends of the PTFE sheet are welded into a cylindrical shape; and a flaring step wherein the ends of the cylindrical PTFE sheet are flared into a horn head shape using a flaring tool, thus finishing the formation of a liner.

In addition, there is provided a method for manufacturing a high performance butterfly valve liner, which may include a pre-processing step wherein a PTFE sheet, which will be processed into a predetermined size and a predetermined thickness, is previously manufactured; a welding formation step wherein the ends of the thusly manufactured PTFE sheet are welded into a cylindrical shape; a flaring step wherein the cylindrical PTFE sheet is fixed using a flaring jig, and a flaring is performed, wherein the ends are flared in a horn head shape; a cap formation step wherein first, second and third cover jigs are brought adjacent the flared PTFE sheet, and air is injected, thus forming a cap-shaped protrusion; and a finishing step wherein the formation of a liner is finished by finish-processing the ends of the thusly formed cap-shaped protrusion.

DESCRIPTION OF SPECIFIC EMBODIMENTS OF THE INVENTION

The configuration of the most preferred exemplary embodiment of the present invention will be described, and the invention would be become apparent though the exemplary embodiments below.

Since the terms or words used in the descriptions and claims of the present specification may be used so as to properly define the meaning of such terms so as to describe in the best way the inventions of the inventor, so such is terms or words should not be interpreted as limiting their dictionary meaning, but should be interpreted as the meaning and concept which well match with the technical ideas of the present invention.

Throughout the descriptions of the present invention, the same components may be given the same reference numbers, and the repeating descriptions may be omitted.

The manufacturing procedure according to an exemplary embodiment of the present invention will be described with reference to the accompanying drawings.

FIGS. 3A to 3D are views illustrating a procedure wherein a liner which belongs to a high performance butterfly valve is being manufactured according to a first exemplary embodiment of the present invention.

As illustrated in FIGS. 3A to 3D, a pre-processing step is performed (step 1), wherein a size (e.g. 24 inches, etc.) and a thickness (e.g. 3-4 mm, etc.) of a PTFE sheet, which will be processed, is set, and one or multiple PTFE sheets 100 and a cap 200 are previously prepared.

At this time, as illustrated in FIG. 1, the cap 200 is formed in a cylindrical shape so that the rotary shaft 30 to which the disk 40 is secured, can be connected through the inside of the liner 20 to the handle 50.

Thereafter, a hole (not shown) is formed at a specific position of the is thusly manufactured PTFE sheet 100, and a first welding step is performed, wherein the cap 200 is welded on the hole (step 2).

After the first welding, a second welding step is performed, wherein the ends (end portions) of the PTFE sheet 100 are welded into a cylindrical shape (step 3).

Thereafter, a liner is formed through a flaring procedure wherein the ends of the cylindrical PTFE sheet 100 are flared in a horn head shape using a flaring tool (not shown) (step 4).

Figure 4A:
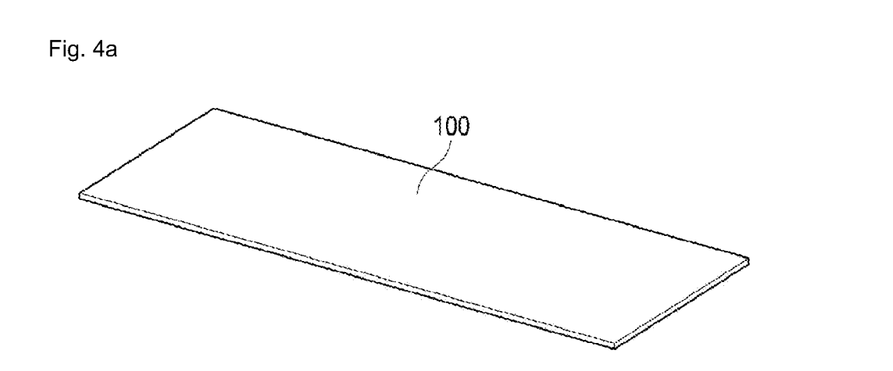
FIGS. 4A to 4G are views illustrating a procedure wherein a liner which belongs to a high performance butterfly valve is being manufactured according to a second exemplary embodiment of the present invention.
Figure 4B:
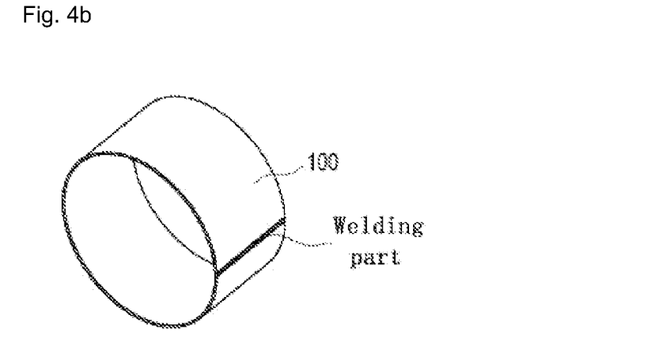
Figure 4C:
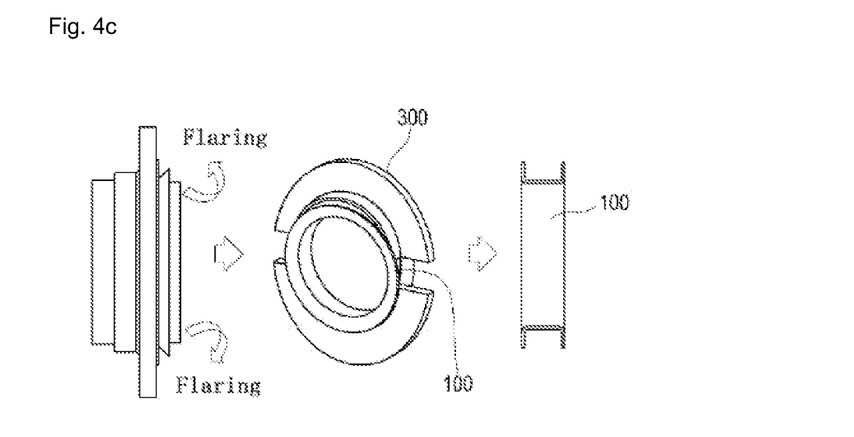
Figure 4D:
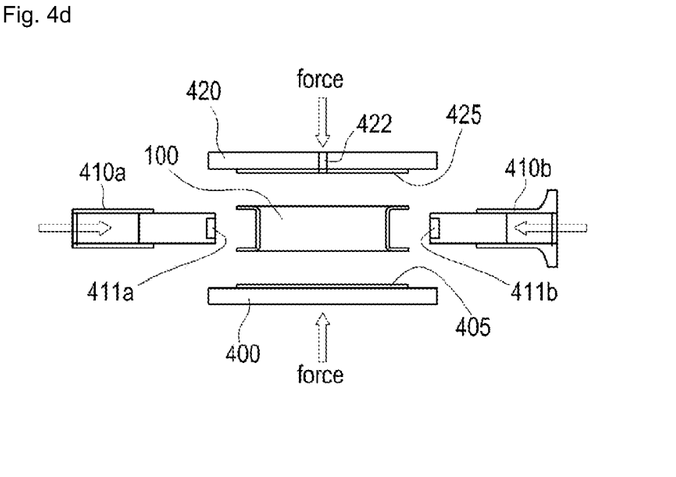
Figure 4E:
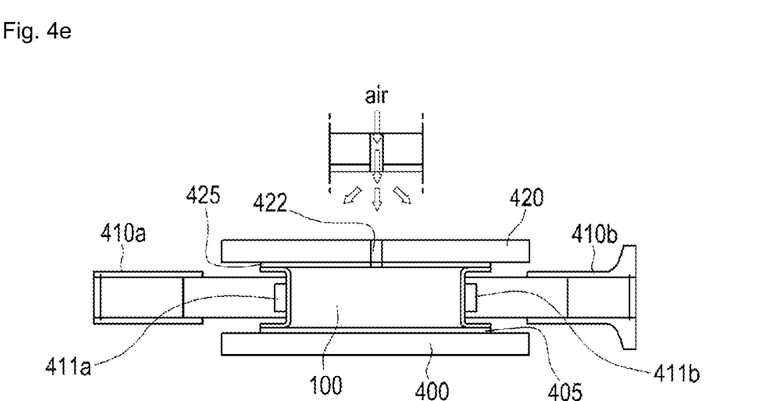
Figure 4F:
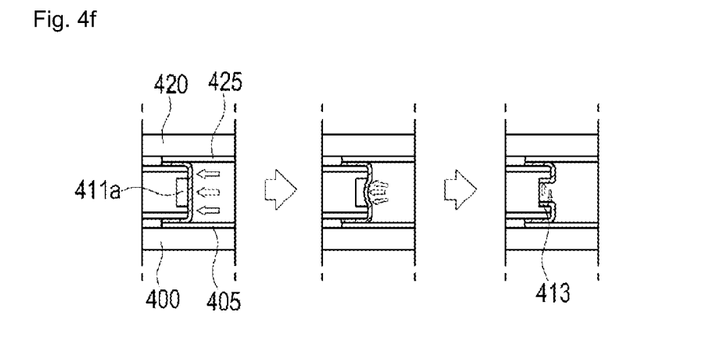
Figure 4G:
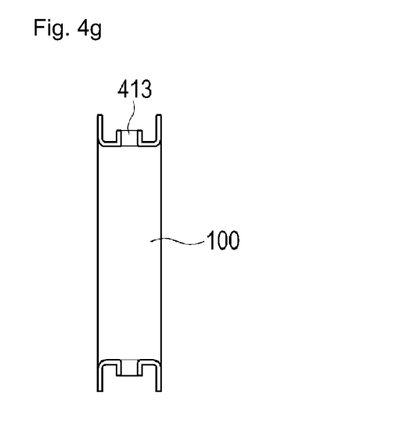

FIGS. 4A to 4B are views illustrating a procedure wherein a liner which belongs to a high performance butterfly valve is being manufactured according to a second exemplary embodiment of the present invention.

As illustrated in FIGS. 4A to 4G, a size and thickness of the PTFE sheet, which will be processed, is set, and a previous process step is performed, wherein one or multiple PTFE sheets 100 are previously manufactured (step 1).

Thereafter, a welding forming step is performed, wherein the ends of the thusly manufactured PTFE sheet 100 are welded into a cylindrical shape (step 2). The above welding formation step may be performed using the same apparatus and method as in the first exemplary embodiment.

Thereafter, the cylindrical PTFE sheet 100 is fixed using a flaring jig 300, and a flaring procedure is performed, wherein the ends are flared in a horn is head shape (step 3).

At this time, since the flaring jig 300 can separate into an upper part and a lower part after the flaring is finished, the flaring jig 300 can be made separable when the flaring procedure ends.

First, second and third cover jigs 400, 410a, 410b and 420 are brought adjacent the flared PTFE sheet 100 (step 4). The first cover jig 400 is secured to beneath the PTFE sheet 100 which lies horizontally. Since a sealing member 405 is secured to the top of the first cover jig 400, an air sealing is conducted using a material, for example, a rubber, etc. so as to seal a through hole from the lower side of the PTFE sheet 100.

Thereafter, the second cover jigs 410a and 410b are brought adjacent both side surfaces of the PTFE sheet 100, and the third cover jig 420 is secured to the top of the PTFE sheet 100 and stands facing the first cover jig 400. The third cover jig 420 to which a sealing member is secured, is air-sealed using a material, for example, a rubber, etc. so that the through hole can be sealed from the top of the PTFE sheet 100.

An air hole 422 for receiving air is formed in the center of the third cover jig 420 which contacts with the PTFE sheet 100. A cap formation step can be performed, wherein a cap-shaped protrusion 413 can be formed by injecting air through the air hole 422 (step 5).

At this time, since grooves 411a and 411b are formed in inwardly concave shapes at a specific portion among the portions of the second cover jigs 410a and 410b, the inside can expand thanks to the air which is injected, and the portions corresponding to the grooves burst, thus forming the protrusion 413.

Thereafter, a finishing step is performed, wherein the formation of the liner is finished by finish-processing the ends of the thusly formed cap-shaped protrusion 413 (step 6).

Although the inventions made by the inventor has been described in detail along with the embodiments, the present invention is not intended to limit the disclosed embodiments, and it is obvious that the present invention may be modified into various forms within a range where the concepts of the invention is not impaired.

INDUSTRIAL APPLICABILITY

As described above, according to the method for manufacturing a high performance butterfly valve liner of the present invention, easy and simple manufacture is possible thereby reducing work time and manufacturing costs. In addition, a large-diameter valve can be readily manufactured without limitations on the size to be formed.

What is claimed is:

1. A method for manufacturing a high performance butterfly valve liner, comprising:
   a pre-processing step wherein a PTFE sheet, which will be processed into a predetermined size and thickness, and a cap are previously manufactured;
   a first welding step wherein a hole is formed at a specific position of the thusly manufactured PTFE sheet, and the cap is welded on the hole;
   a second welding step wherein after the first welding step, the ends of the PTFE sheet are welded into a cylindrical shape; and
   a flaring step wherein the ends of the cylindrical PTFE sheet are flared into a horn head shape using a flaring tool, thus finishing the formation of a liner.

2. The method of claim 1, wherein the cap is formed in a cylindrical shape so that a rotary shaft to which a disk is secured, is connected through the inside of the liner to a handle.

3. A method for manufacturing a high performance butterfly valve liner, comprising:
   a pre-processing step wherein a PTFE sheet, which will be processed into a predetermined size and thickness, is previously manufactured;
   a welding formation step wherein the ends of the thusly manufactured PTFE sheet are welded into a cylindrical shape;
   a flaring step wherein the cylindrical PTFE sheet is fixed using a flaring jig, and a flaring is performed, wherein the ends are flared in a horn head shape;
   a cap formation step wherein first, second and third cover jigs are brought adjacent the flared PTFE sheet, and air is injected, thus forming a cap-shaped protrusion; and
   a finishing step wherein the formation of a liner is finished by finish-processing the ends of the thusly formed cap-shaped protrusion.

4. The method of claim 3, wherein the flaring jig is configured in a structure wherein the flaring jig can separate into an upper part and a lower part after the completion of the flaring.

5. The method of claim 3, wherein an inwardly concave groove is formed at a predetermined portion among the portions which are brought close in the second cover jig, and an air hole into which air is injected, is formed at a third cover jig.

6. The method of claim 3, wherein after the first and third cover jigs are brought adjacent the flared PTFE sheet, the surfaces thereof are air-sealed using a rubber material in order to prevent the air from exiting when the air is injected.

* * * * *